(12) United States Patent
Imamura

(10) Patent No.: US 7,032,099 B1
(45) Date of Patent: *Apr. 18, 2006

(54) PARALLEL PROCESSOR, PARALLEL PROCESSING METHOD, AND STORING MEDIUM

(75) Inventor: Yoshihiko Imamura, Ibaraki (JP)

(73) Assignee: Sony Corporation, (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,798

(22) Filed: Oct. 19, 1999

(30) Foreign Application Priority Data

Oct. 23, 1998 (JP) .............................. P10-302679

(51) Int. Cl.
*G06F 15/00* (2006.01)
(52) U.S. Cl. ........................................ 712/29; 718/102
(58) Field of Classification Search ................ 718/102, 718/107; 712/29–30, 227

See application file for complete search history.

(56) References Cited

U.S. PATENT DOCUMENTS

| | | | | |
|---|---|---|---|---|
| 5,481,747 A * | 1/1996 | Kametani | ................... | 718/102 |
| 5,581,777 A * | 12/1996 | Kim et al. | ..................... | 712/16 |
| 5,634,071 A * | 5/1997 | Dewa et al. | .................. | 712/13 |
| 5,742,824 A * | 4/1998 | Kosaka | ....................... | 718/106 |
| 5,781,775 A * | 7/1998 | Ueno | ......................... | 709/102 |
| 5,787,272 A * | 7/1998 | Gupta et al. | ................ | 713/375 |
| 6,038,584 A * | 3/2000 | Balmer | ........................ | 709/40 |
| 6,263,406 B1 * | 7/2001 | Uwano et al. | ............. | 711/141 |
| 6,330,619 B1 * | 12/2001 | Kreuzburg | .................. | 713/375 |
| 6,581,089 B1 * | 6/2003 | Imamura | .................... | 709/107 |

* cited by examiner

*Primary Examiner*—William Thomson
*Assistant Examiner*—George L. Opie
(74) *Attorney, Agent, or Firm*—Rader, Fishman & Grauer PLLC; Ronald P. Kananen

(57) ABSTRACT

A parallel processor capable of establishing synchronization among programs executed in parallel, wherein a processor element suspends its processing and enters a waiting state when a wait instruction "sleep" is executed in a user program Prg_d and resumes the processing by releasing the above waiting state based on execution of a wait release instruction "cont(Prg_d)" by another processor element and wherein the latter processor element executes a next instruction without suspending its processing after executing the wait release instruction "cont(Prg_d)".

12 Claims, 8 Drawing Sheets

「sleep」: WAIT INSTRUCTION
「cont」: WAIT RELEASE INSTRUCTION
「wait」: SYNCHRONIZATION WAIT INSTRUCTION
「gen」: PROGRAM EXECUTION INSTRUCTION
「end」: PROGRAM END INSTRUCTION 「cont_a」:WAIT RELEASE ORDER 「end」: PROGRAM END INSTRUCTION

PARALLEL PROCESSOR, PARALLEL PROCESSING METHOD, AND STORING MEDIUM

BACKGROUND OF THE INVENTION

1. Field of the Invention

The present invention relates to a parallel processor, parallel processing method, and storing medium for storing the routine of the method in a computer readable format.

2. Description of the Related Art

A single processor running on Unix® or another operating system (OS) must function to manage the progress in a plurality of programs simultaneously existing in a local memory when executing programs under a multi-tasking environment. In such a function, use is made of the concept of a "process" as opposed to the term "program". A "process" is an independent program in execution in a memory space (user memory space) which that program can independently access set in a local memory. Execution of a program means running of a process, while termination of the program means deletion of the process. Also, a process is capable of running and deleting other processes and communicating with other processes.

Since there is one central processing unit (CPU) in a single processor, a maximum of one process can be run at any one time. Therefore, in a single processor, the user memory space is simultaneously assigned to a plurality of independent programs and the plurality of programs are alternately executed in a time sharing mode to alternately run a plurality of processes and thereby realize a multi-tasking environment.

At this time, when one process is in a running state, the other processes are in a waiting state.

In the above multi-tasking environment, a plurality of processes pass messages among each other as described below.

Namely, in a single processor, as explained above, since there is a maximum of one process in a running state at any one time, when one process sending a message is in a running state, another process to receive the message is in a waiting state. Therefore, the running state process sending the message calls up a process management task in a kernel of the OS and writes to send the message in a table in a memory which stores the previous running state of the process to receive the message immediately before it shifted to the waiting state (i.e., normally a table storing context of threads). Then, when the process to receive the message next shifts the running state, it learns that the message was received by referring to the table and performs processing in accordance therewith. On the other hand, for example, when a process is one which proceeds to the next processing conditional on receiving a message and judges that no message was received when shifting to the running state and referring to the table, that process enters the waiting state. That process shifts to the running state only after confirming the receipt of a message.

On the other hand, for example, in a multiprocessor which is comprised of a plurality of CPUs connected via a common bus and executes a plurality of mutually independent programs in parallel, usually a maximum of one process is in a running state at one CPU at any one time, but a plurality of processes can simultaneously be in the running state at different CPUs.

Communication between processes is achieved for example by a sending side process passing a message over the common bus and an arbiter monitoring the common bus notifying that message to the receiving side process based on instruction codes indicated in the user program (i.e. an application program). Therefore, to pass a message between processes, it is necessary that both the message sending side process and receiving side process be in the running state.

In this way, in a multiprocessor, usually messages are not passed using the process management task as in the above explained single processor. That is, there is no process management task in a multiprocessor.

In a multiprocessor, however, when it is necessary to synchronize a plurality of processes operating in parallel, the synchronization is realized by using the above message passing.

Below, a method of synchronizing processes in a multiprocessor of the related art will be explained.

First, the configuration of a general multiprocessor will be explained.

FIG. 5 is a view of the configuration of a general multiprocessor.

As shown in FIG. 5, a multiprocessor 1 is configured by connecting, for example, four processor elements $11_1$ to $11_4$ via a common bus 17. The common bus 17 is connected to a common memory 15 and an arbiter 16.

Here, the processor element $11_1$ comprises, for example as shown in FIG. 6, a processor core 31 and a local memory 32, stores a user program read from the common memory 15 via the common bus 17 in the local memory 32, and successively supplies instruction codes of the user program stored in the local memory 32 to the processor core 31 for execution. The processor elements $11_2$ to $11_4$ have the same configuration, for example, as the processor element $11_1$.

The arbiter 16 monitors execution states (such as the load of the processing) of the processor elements $11_1$ to $11_4$ and assigns software resources stored in the common memory 15 to the processor elements $11_1$ to $11_4$, that is, the hardware resources. Specifically, the arbiter 16 reads the user programs stored in the common memory 15 into the local memories 32 shown in FIG. 6 of the processor elements $11_1$ to $11_4$.

The arbiter 16, for example as shown in FIG. 7, reads a main program Prg_A and subprograms Prg_B, Prg_C, Prg_D, and Prg_E as user programs into the local memories 32 of the processor elements $11_1$ to $11_4$ indicated by the arrows in FIG. 7 at the same time or at different times.

Next, a method of synchronizing among programs or processes of the related art in the multiprocessor 1 shown in FIG. 5 will be explained. First, the main program Prg_A stored in a common memory 15 is read into the local memory 32 of the processor element $11_1$ by the arbiter 16, then, as shown in FIG. 8, instruction codes written in the main program Prg_A are successively executed in the processor element 111.

Next, when the instruction code "gen(Prg_B)" is executed in the processor element $11_1$, a message indicating that is notified to the arbiter 16 via the common bus 17. Then, the subprogram Prg_B stored in the common memory 15 is read into the local memory 32 of the processor element $11_2$, by the arbiter 16 based on the execution states of the processor elements $11_1$ to $11_4$, and instruction codes written in the subprogram Prg_B are successively executed in the processor element $11_2$.

Next, when an instruction code "gen(Prg_C)" is executed in the processor element $11_1$, a message indicating that is notified to the arbiter 16 via the common bus 17. Then, the subprogram Prg_C stored in the common memory 15 is read into the local memory 32 of the processor element $11_3$ by the arbiter 16 based on the execution states of the processor elements $11_1$ to $11_4$, and instruction codes written in the subprogram Prg_C are successively executed in the processor element $11_3$.

Next, when an instruction code "gen(Prg_D)" is executed in the processor element $11_1$, a message indicating that is notified to the arbiter 16 via the common bus 17. The subprogram Prg_D stored in the common memory 15 is then read into the local memory 32 of the processor element $11_4$ by the arbiter 16 based on the execution states of the processor elements $11_1$ to $11_4$, and instruction codes written in the subprogram Prg_D are successively executed in the processor element $11_4$.

Next, when an instruction code "wait(Prg_D)" is executed in the processor element $11_1$, the processing of the processor element $11_1$ enters a synchronization waiting state.

Next, when the last instruction code "end" of the subprogram Prg_D is executed in the processor element $11_4$, a message indicating the completion of the subprogram Prg_D is notified to the processor element $11_1$ via, for example, the arbiter 16. As a result, the processor element $11_1$ releases the synchronization waiting state and executes the next instruction code.

Next, when an instruction code "wait(Prg_C)" is executed in the processor element $11_1$, the processing of the processor element $11_1$ enters a synchronization waiting state.

Next, when the last instruction code "end" of the subprogram Prg_C is executed in the processor element $11_3$, a message indicating the completion of the subprogram Prg_C is notified to the processor element $11_1$ via, for example, the arbiter 16. As a result, the processor element $11_1$ releases the synchronization waiting state and executes the next instruction code.

Next, when an instruction code "gen(Prg_E)" is executed in the processor element $11_1$, a message indicating that execution is notified to the arbiter 16 via the common bus 17. Then, the subprogram Prg_E stored in the common memory 15 is read into the local memory of, for example, the processor element $11_4$ by the arbiter 16 based on the execution states of the processor elements $11_1$ to $11_4$, and instruction codes written in the subprogram Prg_C are successively executed in the processor element $11_4$.

Next, when the instruction code "gen(Prg_D)" is executed again in the processor element $11_1$, a message indicating that execution is notified to the arbiter 16 via the common bus 17. Then, the subprogram Prg_D stored in the common memory 15 is read into the local memory 32 of the processor element $11_3$ by the arbiter 16 based on the execution states of the processor elements $11_1$ to $11_4$, and instruction codes written in the subprogram Prg_D are successively executed in the processor element $11_3$.

Summarizing the problems to be solved by the invention, as explained above, in the multiprocessor 1 of the related art, the synchronization between the programs processes executed in different processor elements is a simple one of release of a synchronization waiting state caused by execution of an instruction code "wait" in one processor element based on execution of an instruction code "end" indicating completion of execution of a program in another processor element.

Namely, a synchronization waiting state of a processor element based on one program cannot be released until the completion of execution of a program in another processor element. Accordingly, there is a disadvantage that a variety of forms of synchronization among different programs executed at different processor elements such as synchronization among instruction codes written in the middle of programs cannot be realized.

Also, in the above embodiment, the arbiter 16 cannot for example determine which subprogram will be called up in the future by a main program Prg_A shown in FIG. 8 during execution of the main program Prg_A by the processor element $11_1$.

Therefore, as shown in FIG. 8, there is a possibility that the subprogram Prg_D will end up being assigned to different processor elements $11_3$ and $11_4$ by the arbiter 16 between a first execution and a second execution of the instruction code "gen(Prg_D)" in a processor element $11_1$. In such a case, although the subprogram Prg_D is executed again after a relatively short interval, it is necessary to read the subprogram Prg_D from the common memory 15 to the processor element $11_3$ at the time of the second execution, which results in a longer waiting time of the processor element $11_3$.

Such a situation frequently occurs especially when the memory capacity of the local memory shown in FIG. 6 and the size of the program to be read are of the same order and causes a drastic decline of performance of the multiprocessor 1.

SUMMARY OF THE INVENTION

An object of the present invention is to provide a parallel processor and a parallel processing method enabling various forms of synchronization among programs executed in parallel and a storing medium for storing the routine of the method in a computer-readable format.

Another object of the present invention is to provide a parallel processor which can shorten a waiting time of a processor element caused by transfer of a user program between a local memory of the processor element and a common memory.

To achieve the above objects, according to a first aspect of the present invention, there is provided a parallel processor comprising a plurality of processing means which perform mutually parallel processing on the basis of instructions written in programs and are capable of communicating with each other via a common bus, wherein one of the processing means suspends processing based on a program and enters a waiting state when executing a wait instruction and releases the waiting state and restarts the processing based on the program based on execution of a wait release instruction by another processing means and the other processing means executes a next instruction without suspending processing after it executes the wait release instruction.

In the parallel processor according to the first aspect of the present invention, synchronization is established between one processing means and another processing means at the instruction level while both are executing programs by using a wait instruction and a wait release instruction in the programs. Namely, it is possible to synchronize among programs without having to wait for completion of execution of one program.

Preferably, the other processing means executes a synchronization wait instruction to enter a synchronization waiting state and releases the synchronization waiting state based on execution of the wait instruction corresponding to the synchronization wait instruction or execution of a program end instruction indicating an end of a program by the one processing means.

Due to this, execution of a wait instruction in one processing means prior to execution of a wait release instruction in another precessing means can be prevented.

According to a second aspect of the present invention, there is provided a parallel processor comprising a plurality of processing means which perform mutually parallel processing on the basis of instructions written in programs and are capable of communicating with each other via a common bus, wherein one of the processing means suspends processing based on a program and enters a waiting state when executing a wait instruction and releases the waiting state and restarts the processing based on the program based on execution of a wait release instruction by another processing means and the other processing means enters a synchronization waiting state when executing the wait release instruction until the one processing means enters the waiting state when that one processing means is not in the waiting state.

Namely, in the parallel processor according to the second aspect of the present invention, synchronization is established between one processing means and another processing means at an instruction level by using a wait instruction and wait release instruction in the programs. Namely, it is possible to synchronize among programs without waiting for completion of execution of one program. Also, even if a synchronization wait instruction corresponding to a wait release instruction is not written in a program to be processed by another processing means, a synchronization waiting state is maintained until the other processing means enters the waiting state when the one processing means is not in a waiting state.

According to a third aspect of the present invention, there is provided a parallel processor comprising a plurality of processing means which perform mutually parallel processing on the basis of instructions written in programs and are capable of communicating with each other via a common bus, comprising a first storage means connected to the common bus for storing the programs and second storage means provided corresponding to the plurality of processing means, reading from the first storage means programs to be executed by corresponding processing means via the common bus, supplying the processing means with instructions written in the read programs, and having faster access speeds than the first storage means; one of the processing means suspending processing based on a program and entering a waiting state when executing a wait instruction and releasing the waiting state and restarting the processing based on the program based on execution of a wait release instruction by another processing means; a second storage means continuing to store a program supplied to its corresponding processing mean before entering the waiting state when the processing means is in the waiting state.

In the parallel processor according to the third aspect of the present invention, if one processing means suspends its processing based on the program and enters a waiting state when executing a wait instruction and releases the waiting state and resumes the processing based on the program based on execution of a wait release instruction by another processing means, the program supplied to the one processing means is continuously stored in the second storage means corresponding to the one processing means. Namely, when restarting execution of the program, it is not necessary to read the program from the first storage means to the second storage means.

According to a fourth aspect of the present invention, there is provided a parallel processing method for performing at least first processing and second processing in parallel based on instructions written in programs, wherein the first processing suspends processing based on a program and enters a waiting state by executing a wait instruction and releases the waiting state and resumes processing based on the program based on execution of a wait release instruction in the second processing and the second processing executes a next instruction without suspending its processing after executing the wait release instruction.

According to a fifth aspect of the present invention, there is provided a parallel processing method for performing at least first processing and second processing in parallel based on instructions written in programs, wherein the first processing suspends processing based on a program and enters a waiting state by executing a wait instruction and releases the waiting state and resumes processing based on the program based on execution of a wait release instruction in the second processing and the second processing enters a synchronization waiting state by executing the wait release instruction until the first processing enters the waiting state when the first processing is not in the waiting state.

According to a sixth aspect of the present invention, there is provided a storage medium for storing in a computer-readable format routines of first processing and second processing to be performed in parallel based on instructions written in programs, wherein the first processing is processing which suspends processing based on a program and enters a waiting state by executing a wait instruction and releases the waiting state and resumes processing based on the program based on execution of a wait release instruction in the second processing and the second processing is processing which executes a next instruction without suspending its processing after executing the wait release instruction.

According to a seventh aspect of the present invention, there is provided a storage medium for storing in a computer-readable format routines of first processing and second processing to be performed in parallel based on instructions written in programs, wherein the first processing is processing which suspends processing based on a program and enters a waiting state by executing a wait instruction and releases the waiting state and resumes processing based on the program based on execution of a wait release instruction in the second processing and the second processing is processing which enters a synchronization waiting state by executing the wait release instruction until the first processing enters the waiting state when the first processing is not in the waiting state.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments of a multiprocessor according the present invention will be described with reference to the accompanying drawings.

First Embodiment

Figure 1:
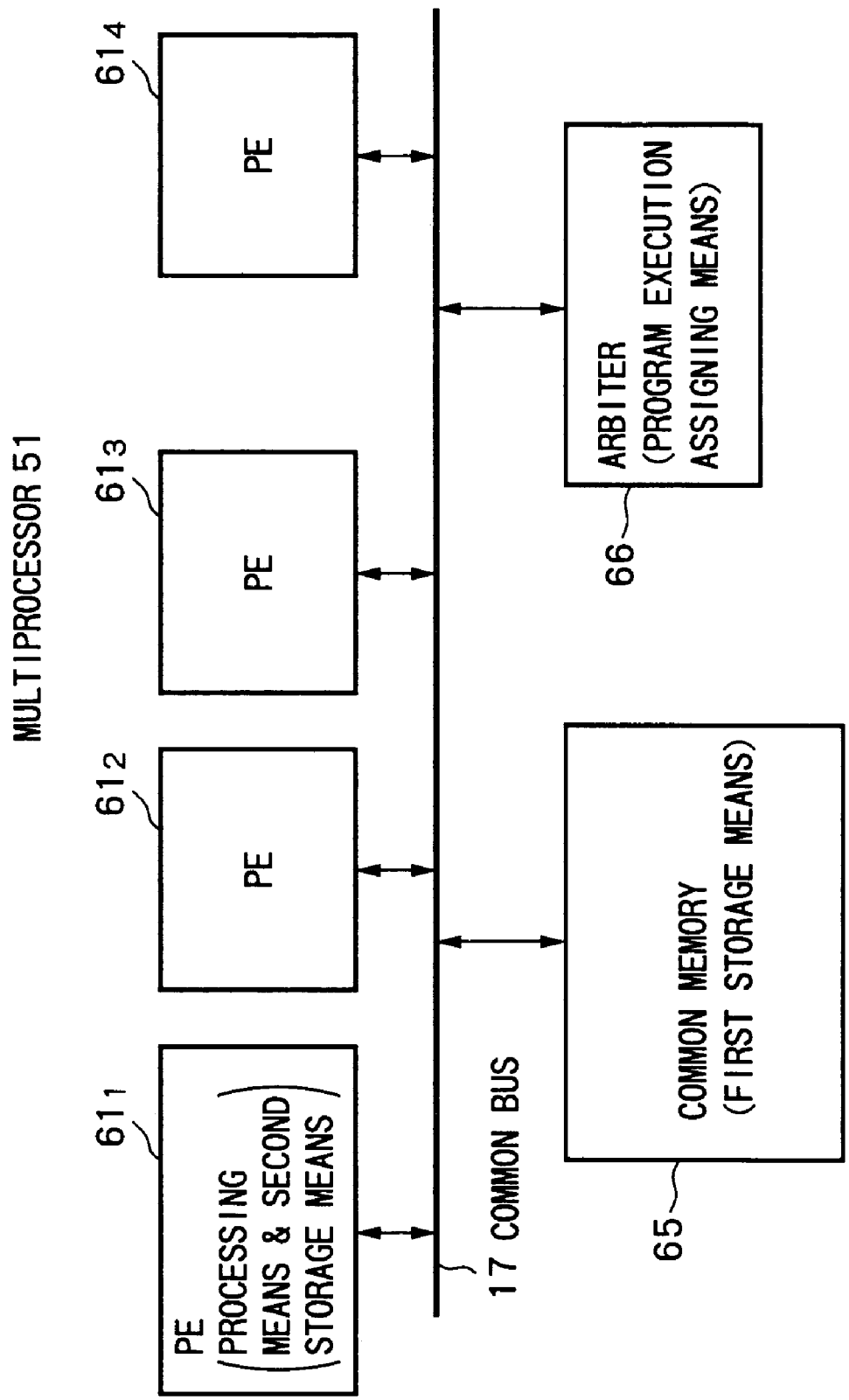
FIG. 1 is a view of the configuration of a multiprocessor according to a first embodiment of the present invention.

FIG. 1 is a view of the configuration of a multiprocessor 51 according to a first embodiment of the present invention.

As shown in FIG. 1, a multiprocessor 51 comprises, for example, a common bus 17, processor elements $61_1$ to $61_4$ serving as processing means and second storage means, a common memory 65 serving as a first storage means, and an arbiter 66 serving as a program assigning means.

The multiprocessor 51 adopts a bus-connected architecture where the processor elements $61_1$ to $61_4$, the common memory 65, and the arbiter 66 are mutually connected via, for example, the common bus 17. These components are built in a single semiconductor chip.

(Outline of Components)

Points in common and of difference between the multiprocessor 51 and the multiprocessor 1 shown in FIG. 5 will be explained first.

Figure 5:
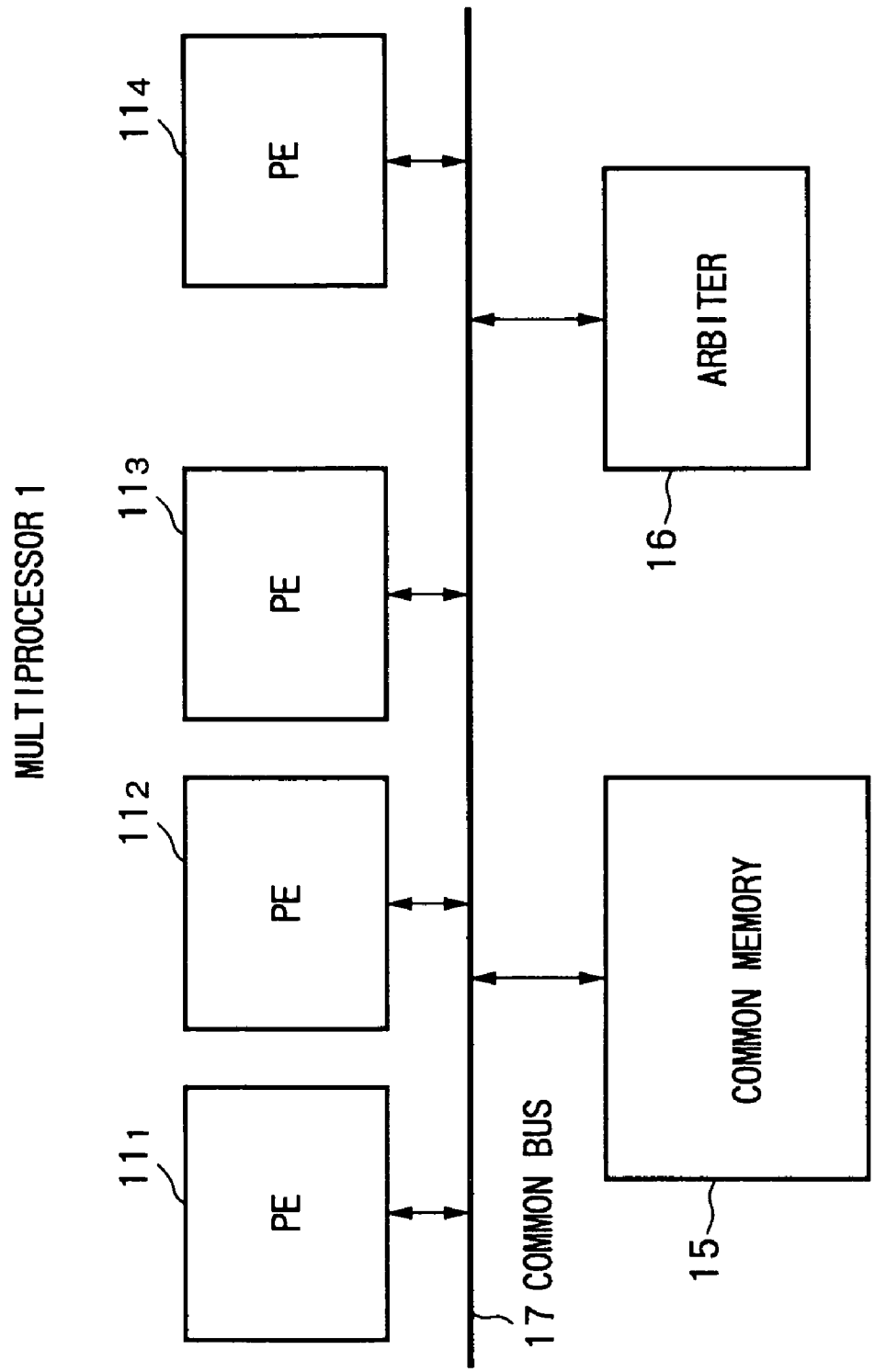
FIG. 5 is a view of the configuration of a general multiprocessor.

The common bus 17 is the same as the common bus 17 in the multiprocessor 1 of the related art shown in FIG. 5.

Figure 6:
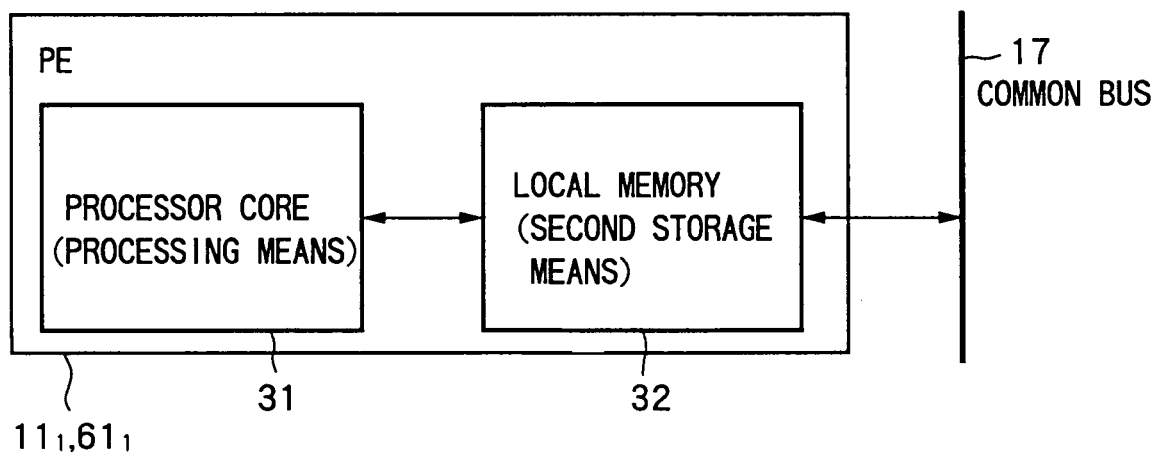
FIG. 6 is a view of the configuration inside a processor element shown in FIGS. 1 and 5.
Figure 7:
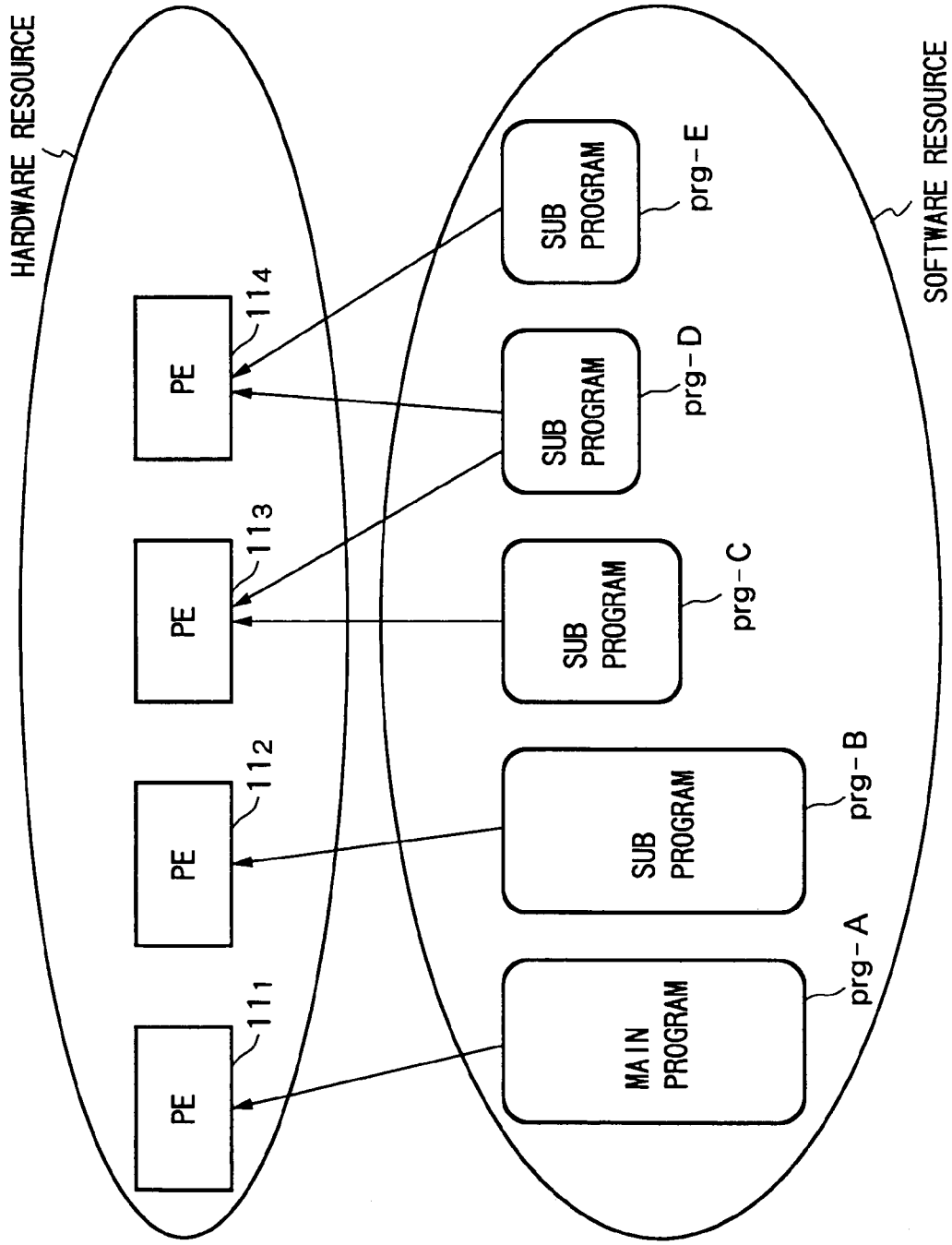
FIG. 7 is a view for explaining assignment of programs to processor elements of the multiprocessor shown in FIG. 5.

Also, the processor elements $61_1$ to $61_4$ are the same as the processor elements $11_1$ to $11_4$ shown in FIG. 5 in terms of the hardware configuration of each having a processor core 31 and a local memory 32 as shown in FIG. 6: however, these elements operate differently along with execution of instruction codes because the processor elements $61_1$ to $61_4$ execute new instruction codes for establishing synchronization between programs or processes not provided in the multiprocessor 1 of the related art.

The memory 65 has the same hardware configuration as the common memory 15 shown in FIG. 5, however, stores a user program of a different content.

Furthermore, the arbiter 66 is the same as the arbiter 16 shown in FIG. 5 in the points that it monitors execution states (e.g., load of processing and so forth) of the processor elements $61_1$ to $61_4$ and assigns software resources stored in the common memory 65 to the processor elements $61_1$ to $61_4$ that is, the hardware resources, based on the execution states. The arbiter 66 however performs processing for establishing various forms of synchronization different from that by the arbiter 16 shown in FIG. 5 and assigns processing of user programs to the processor elements $61_1$ to $61_4$ when the above new instruction codes are executed by the processor elements $61_1$ to $61_4$.

(Instruction Codes)

The multiprocessor 51 adopts the instruction codes explained below.

Specifically, the multiprocessor 51 has as instruction codes: "gen(user program name)" as a program execution instruction, "wait(user program name)" as a synchronization wait instruction, "cont(user program name)" as a wait release instruction, "sleep" as a wait instruction, and "end" as a program end instruction. Note that the multiprocessor 51 further has the variety of instruction codes, for example, provided in general-purpose multiprocessors.

Here, the instruction codes "gen(user program name)", "wait(user program name)", and "end" are the same as the instruction codes having the identical names adopted in the multiprocessor 1 shown in FIG. 5, while the instruction codes "cont(user program name)" and "sleep" are first adopted in the multiprocessor 51.

Note that the instruction codes "gen(user program name)", "wait(user program name)", and "cont(user program name)" use user program names as arguments. Note that there may be any number of arguments.

The instruction code "gen(user program name)" is for instructing one of the other processor elements $61_1$ to $61_4$ to start executing a user program specified by the argument (user program name).

The instruction code "wait(user program name)" is for instructing an element to wait for synchronization until a user program specified by the argument (user program name) executes an instruction code "sleep" or "end".

The instruction code "cont(user program name)" is for instructing one of the other processor elements $61_1$ to $61_4$ executing a user program specified by the argument (user program name) to release the waiting state when in the waiting state.

The instruction code "sleep" is for instructing elements to temporarily stop the execution of a user program and enter the waiting state.

Note that the above instruction codes may be written in the user program when the programmer prepares the user program or may be automatically inserted in accordance with need by a compiler.

(Details of Components)

The processor element $61_1$ has, as shown in FIG. 5, a processor core 31 serving as a processing means and a local memory 32 serving as a second storage means.

Note that in the present embodiment, a case will be explained where the processor elements $61_1$ to $61_4$ have the same configuration as each other. In the present invention, however, the processor elements $61_1$ to $61_4$ are not necessarily the same in configuration. For example, the execution speed of the processor core 31, memory capacity of the local memory 32, may be different.

The local memory 32 stores a user program read from the common memory 15 via the common bus 17.

The processor core 31 successively reads and executes the instruction codes of the user program stored in the local memory 32.

When the instruction code "gen(user program name)" is executed, the processor core 31 outputs an execution instruction of the user program specified by the argument (user program name) to the arbiter via the common bus 17 shown in FIG. 1.

When the instruction code "wait(user program name)" is executed, the processor core 31 enters a synchronization waiting state, while when a notice indicating that the instruction code "end" or "sleep" of the user program specified by the argument (user program name) is executed is input from the arbiter 66 via the common bus 17 shown in FIG. 1, the synchronization waiting state is released and the next instruction code is executed.

When the processor core 31 executes the instruction code "cont(user program name)", it outputs an instruction to release the state of waiting for execution of the user program specified by the argument (user program name) to the arbiter 66 via the common bus 17 and executes the next instruction code without suspending the processing.

When the processor core 31 executes the instruction code "sleep", it notifies the arbiter 66 that the instruction code is executed via the common bus 17 and simultaneously enters a waiting state. When an instruction to release the waiting state is input from the arbiter 66, the processor core 31 releases the waiting state and executes the next instruction code.

Also, when the processor core 31 executes the instruction code "end", it notifies the arbiter 66 that the instruction code is executed via the common bus 17 and simultaneously ends the execution of the program.

The common memory 65 stores, for example, user programs Prg_a, Prg_b, Prg_c, Prg_d, and Prg_e writing various instruction codes including the above "gen(user program name)", "wait(user program name)", "cont(user program name)", "sleep", and "end".

When an execution instruction of a user program is input from one of the processor elements $61_1$ to $61_4$ via the common bus 17, the arbiter 66 reads the user program specified by the execution instruction from the common memory 65 to, for example, the local memory 32 of the one of the processor elements $61_1$ to $61_4$ having the smallest load based on the execution states of the processor elements $61_1$ to $61_4$.

Also, when an instruction to release the waiting state of execution of the user program is input, the arbiter 66 outputs an instruction indicating to release the waiting state to the one of the processor elements $61_1$ to $61_4$ executing the user program specified by the instruction via the common bus 17.

When a notice indicating that the instruction codes "sleep" and "end" were executed is input from one of the processor elements $61_1$ to $61_4$, the arbiter 66 notifies the one of the processor elements $61_1$ to $61_4$ which output the instruction for executing the program including the instruction codes that the notice was input.

Next, the operation of the multiprocessor 51 will be explained while tracing the process of execution of user programs in the processor elements $61_1$ to $61_4$ of the multiprocessor 51 shown in FIG. 1.

Figure 2:
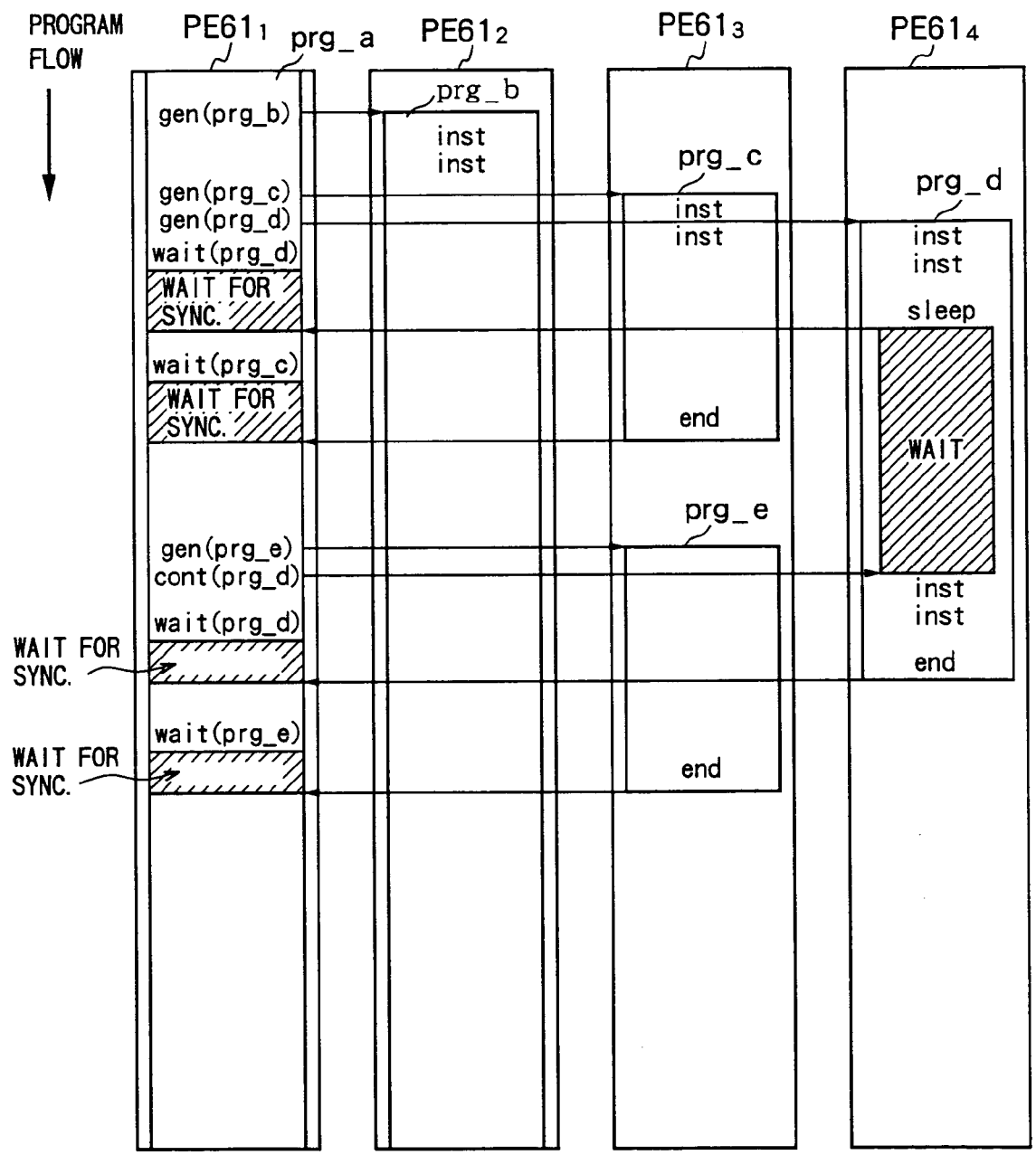
FIG. 2 is a view for explaining the operation of the multiprocessor according to the first embodiment of the present invention shown in FIG. 1.

Here, as shown in FIG. 2, a case is illustrated where user programs Prg_a, Prg_b, Prg_c, Prg_d, and Prg_e are executed in the processor elements $61_1$, $61_2$, $61_3$, and $61_4$.

Note that the user programs Prg_a, Prg_b, Prg_c, Prg_d, and Prg_e are read to the common bus 17 shown in FIG. 1 from a computer-readable storage medium such as a magnetic disk, magnetic tape, optical disk, or magneto-optic disk.

First, the arbiter 66 reads the user program Prg_a shown in FIG. 2 from the common memory 66 into the local memory 32 of the processor element $61_1$.

Then, instruction codes written in the user program Prg_a are successively executed in the processor core 31 of the processor element $61_1$.

Specifically, an instruction code "gen(Prg_b)" is executed first in the processor core 31 of the processor element $61_1$, then an execution instruction of the user program Prg_b specified by the argument of the instruction code is output to the arbiter 66 via the common bus 17 shown in FIG. 1.

Then, the arbiter 66 reads the user program Prg_b from the common memory 65 into the local memory 32 of the processor element $61_2$ via the common bus 17. Then, instruction codes written in the user program Prg_b stored in the local memory 32 are successively read and executed in the processor element $61_2$.

Next, the processor core 31 of the processor element $61_1$ successively executes instruction codes "gen(Prg_c)" and "gen(Prg_d)". Through similar processing as in the above instruction code "gen(Prg_a)", the processor cores 31 of the processor element $61_3$ and $61_4$ respectively start to execute the user programs Prg_c and Prg_d.

Next, the processor core 31 of the processor element $61_1$ executes an instruction code "wait(Prg_d)" and enters a synchronization waiting state.

Then, the processor element 614 executes an instruction code "sleep" written in the user program Prg_d and enters a waiting state.

Also, the arbiter 66 is notified via the common bus 17 that the instruction code "sleep" was executed in the processor element $61_4$. When the notice is input to the arbiter 66, the arbiter 66 notifies that the notice was input to the processor element $61_1$ which output the instruction to execute the user program Prg_d.

Then, when the processor element $61_1$ receives as an input the notice from the arbiter 66, the synchronization waiting state is released and the next instruction code is executed in the processor element $61_1$.

Next, the processor core 31 of the processor element $61_1$ executes an instruction code "wait(Prg_c)" and enters a synchronization waiting state.

Then, an instruction code "end" written at the end of the user program Prg_c is executed in the processor element $61_3$, whereupon the execution of the user program Prg_c by the processor element $61_3$ is ended.

Also, the arbiter 66 is notified via the common bus 17 that the instruction code "end" was executed in the processor element $61_3$.

When the notice is input to the arbiter 66, the arbiter 66 notifies the processor element $61_1$ which output the instruction to execute the user program Prg_c that the notice was input.

When the notice is input to the processor element $61_1$ from the arbiter 66, the synchronization waiting state is released and the next instruction code is executed in the processor element $61_1$.

Note that when the notice indicating the instruction code "end" was executed in the processor element $61_3$, the arbiter 66 judges that the load on the processor element $61_3$ is lifted and frees the local memory 32 of the processor element $61_3$.

Next, the processor core 31 of the processor element $61_1$ executes the instruction code "gen(Prg_e)", and, through similar processing as in the case of the above instruction code "gen(Prg_a)", the user program Prg_e is read to the local memory 32 of the processor element $61_3$ which is freed as explained above and the processor core 31 of the processor element $61_3$ executes the user program Prg_e.

Next, the processor element $61_1$ executes the instruction code "cont(Prg_d)" and outputs an instruction to release the waiting state for executing the user program Prg_d to the arbiter 66 via the common bus 17. Then, the arbiter 66 outputs via the common bus 17 the instruction to release the waiting state to the processor element $61_4$ executing the user program Prg_d.

When the processor element $61_4$ receives as an input the instruction from the arbiter 66, the waiting state is released and the next instruction code is executed in the processor element $61_4$.

Note that after executing the instruction code "cont (Prg_d)", the processor element $61_1$ executes the next instruction code without suspending the processing.

Next, the processor core 31 of the processor element $61_1$ executes the instruction code "wait(Prg_d)" and enters a synchronization waiting state.

Then, an instruction code "end" written at the end of the user program Prg_d is executed in the processor element $61_4$, whereupon the execution of the user program Prg_d in the processor element $61_4$ is ended.

Also, the arbiter 66 is notified via the common bus 17 that the instruction code "end" was executed in the processor element $61_4$. When the notice is input to the arbiter 66, it is notified from the arbiter 66 to the processor element $61_1$ which output the instruction to execute the user program Prg_d that the notice was input.

When the processor element $61_1$ receives as an input the notice from the arbiter 66, the synchronization waiting state is released and the next instruction code is executed in the processor element $61_1$.

Note that when the arbiter 66 receives as an input the notice indicating that the instruction code "end" was executed in the processor element $61_4$, as explained above, the arbiter 66 judges that the load on the processor element $61_4$ was lifted and frees the local memory 32 of the processor element $61_4$.

Next, the processor core 31 of the processor element $61_1$ executes the instruction code "wait(Prg_e)" and enters a synchronization waiting state.

Then the instruction code "end" written at the end of the user program Prg_e is executed in the processor element $61_3$, whereupon the execution of the user program Prg_e in the processor element $61_3$ is ended.

Also, the arbiter 66 is notified via the common bus 17 that the instruction code "end" is executed in the processor element $61_3$. When the notice is input to the arbiter 66, the arbiter notifies the processor element $61_1$ which output the instruction to execute the user program Prg_e that the notice is input.

When the processor element $61_1$ receives as an input the notice from the arbiter 66, the synchronization waiting state is released and the next instruction code is executed in the processor element $61_1$.

Note that when the arbiter 66 receives as an input the notice indicating that the instruction code "end" is executed in the processor element $61_3$, as explained above, the arbiter judges that the load of the processor element $61_3$ is lifted and frees the local memory 32 of the processor element $61_3$.

As explained above, according to the multiprocessor 51, by using the instruction code "sleep" to instruct a waiting state for execution of the program and the instruction code "cont" to release the waiting state in addition to the instruction code "end" to indicate an end of the program, it is possible to establish synchronization between instruction codes of programs being executed in different processor elements $61_1$ to $61_4$. Therefore, according to the multiprocessor 51, it can be made possible to perform a variety of processings based on programs written to establish synchronization between instruction codes.

Namely, in the same way as with the multiprocessor 1 of the related art, it becomes possible to establish synchronization between user programs without an end of execution of the user program by an instruction code "end".

Also, according to the multiprocessor 51, as shown in FIG. 2, since an instruction code "wait(Prg_d)" is written prior to an instruction code "cont(Prg_d)" in the user program Prg_a, it is possible to prevent an instruction code "cont(Prg_d)" from being executed prior to an execution of an instruction code "sleep" of the user program Prg_d. As a result, the waiting state of the processor element $61_4$ due to the instruction code "sleep" is reliably released by the execution of the instruction code "cont(Prg_d)" in the processor element $61_1$.

Also, according to the multiprocessor 51, when an instruction code "sleep" is executed, by inputting to the arbiter 66 a notice indicating that the instruction code "sleep" is executed, it becomes possible for the arbiter 66 to know that the execution of a user program including the instruction code "sleep" is to be resumed in the future. Therefore, the arbiter 66 can prevent the user program from being switched with another user program and the number of operations to read the user program is reduced, so the processing time can be made shorter.

Specifically, in the example shown in FIG. 2, it is sufficient to read only once the user program Prg_d from the common memory 65 to the local memory 32 of the processor element $61_4$, so the waiting time for the processor element $61_4$ to read the user program Prg_d can be made shorter. Also, when resuming the execution of the user program Prg_d, this is instantly notified to the processor element $61_4$ by the execution of the instruction code "cont(Prg_d)" in the processor element $61_1$. This is effective especially when executing a user program requiring real time characteristics in which high speed response is required.

Figure 8:
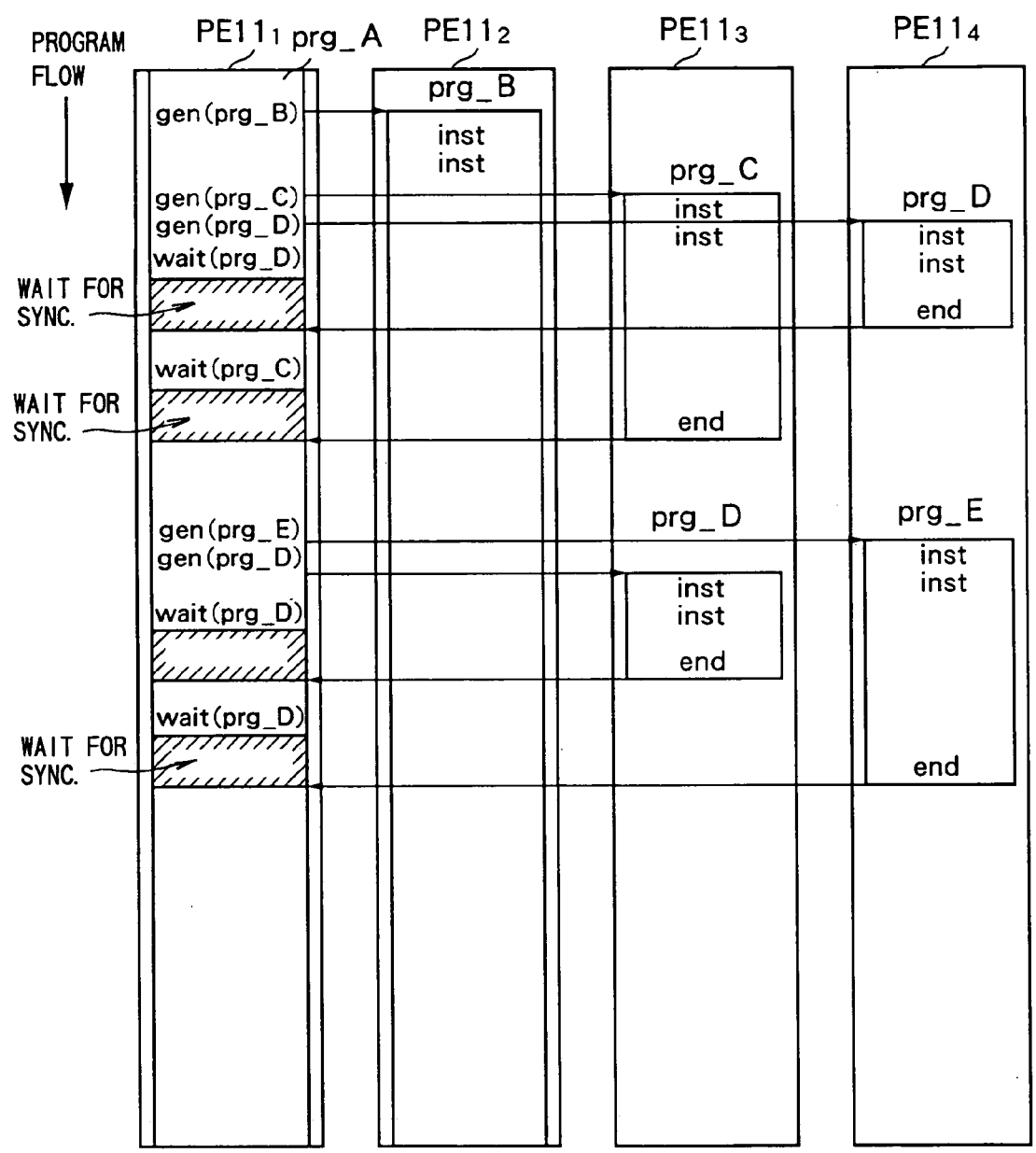
FIG. 8 is a view for explaining the operation of the general multiprocessor shown in FIG. 5.

Namely, it is possible to prevent needless operation of the processor element $11_1$ reading a user program Prg_D to the local memory 32 when executing the instruction code "gen (Prg_D)" for the second time as explained using FIG. 8.

The effect of the prevention of needless reading of the user program from the common memory 65 to the local memory 32 is especially remarkable when the memory capacity of the local memory 32 and the size of the user program to be read are of the same order.

Second Embodiment

The multiprocessor of the second embodiment is basically the same as the multiprocessor 51 of the first embodiment. The point of difference from the multiprocessor 51, however, is that it uses an instruction code "cont_a" as a wait release instruction, which will be explained below, instead of using the instruction code "cont" of the fist embodiment.

Namely, when execution of an instruction code "cont" in one processor element comes later than execution of an instruction code "sleep" corresponding to the instruction code "cont" in other processor elements, the instruction code "cont" of the above first embodiment cannot release the waiting state of the other processor elements due to the instruction code "sleep". In order to prevent such a situation, in the first embodiment, for example as shown in FIG. 2, it was necessary to write in the user program Prg_a an instruction code "wait(Prg_d)" and release the synchronization waiting state by execution of an instruction code "sleep" of the user program Prg_d prior to the writing of an instruction code "cont(Prg_d)".

In the present embodiment, by using a new instruction code "cont_a" instead of the instruction code "cont" of the first embodiment, the writing of an instruction code "wait" prior to that is made unnecessary.

The instruction code "cont_a" designates a user program name as an argument in the same way as the instruction code "cont". Namely, the instruction format becomes "cont_a (user program name)".

Also, when the "cont_a(user program name)" is executed, processor cores 31 of the processor elements $61_1$ to $61_4$ output instructions to release the waiting state for executing the user program specified by the argument (user program name) to the arbiter 66 via the common bus 17 shown in FIG. 1.

When the instruction code "cont_a(user program name)" is executed, the processor cores 31 execute the next instruction codes without suspending the processing.

Also, the processor elements $61_1$ to $61_4$, after receiving as input an inverse synchronization waiting instruction from the arbiter 66, enter an inverse synchronization waiting state until an instruction to release the state is input from the arbiter 66.

When the instruction to release a waiting state for execution of a user program is input, the arbiter 66 judges whether the user program is in the waiting state.

When it is judged to be in the waiting state, the arbiter 66 outputs to the one of the processor elements $61_1$ to $61_4$ assigned the user program in the waiting state an instruction to release the waiting state via the common bus 17.

On the other hand, when it is judged in the above judgement that the user program is not in the waiting state, the arbiter 66 outputs an inverse synchronization waiting instruction to the one of the processor elements $61_1$ to $61_4$ which output the instruction to release the waiting state for the execution of the user program. Then, when the notice that an instruction code "sleep" was executed is received as an input, the arbiter 66 outputs to the one of the processor elements $61_1$ to $61_4$ in the above inverse synchronization waiting state an instruction indicating to release the state and, at the same time, outputs to the one of the processor elements $61_1$ to $61_4$ which executed the instruction code "sleep" via the common bus 17 an instruction to release the waiting state.

Below, the operation of the multiprocessor of the present embodiment will be explained by tracing the process of execution of user programs in the processor elements $61_1$ to $61_4$ shown in FIG. 1.

Figure 3:
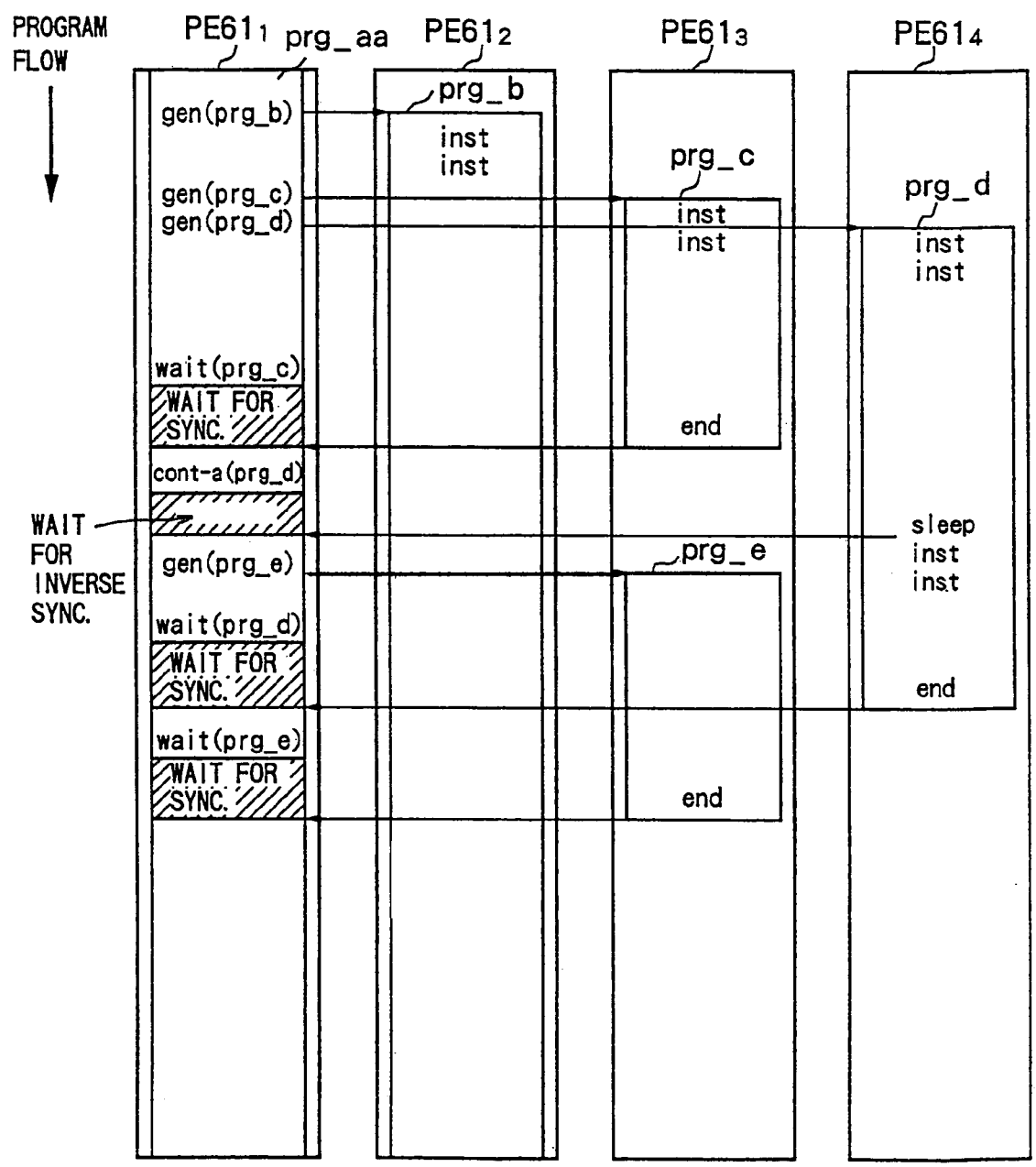
FIG. 3 is a view for explaining the operation of a multiprocessor according to a second embodiment of the present invention.

Here, as shown in FIG. 3, a case will be explained where user programs Prg_aa, Prg_b, Prg_c, Prg_d, and Prg_e are executed in the processor elements $61_1$ to $61_4$ shown in FIG. 1.

The user program Prg_aa shown in FIG. 3 is different from the above user program Prg_a in the point that an instruction code "cont_a(Prg_d)" is written instead of the instruction code "cont(Prg_d)" and the instruction "wait (Prg_d)" prior to that shown in FIG. 2. The user programs Prg_b, Prg_c, Prg_d, and Prg_e are respectively the same as the user programs Prg_b, Prg_c, Prg_d, and Prg_e shown in FIG. 2.

First, as shown in FIG. 3, the processor element $61_1$ successively executes instruction codes "gen(Prg_b)", "gen (Prg_c)", "gen(Prg_d)", and "wait(Prg_c)" written in the user program Prg_aa.

The processing is the same as that of the above instruction codes having identical names explained by using FIG. 2.

When a synchronization waiting state due to the instruction code "wait(Prg_c)" is released, the instruction code "cont_a(Prg_d)" is executed in the processor core 31 of the processor element $61_1$.

As a result, an instruction to release the waiting state for execution of the user program Prg_d is output from the processor element $61_1$ to the arbiter 66 via the common bus 17 shown in FIG. 1.

Then, it is judged in the arbiter 66 whether the user program Prg_d being executed in the processor element $61_4$ is in the waiting state or not. Since it is not in the waiting state in this case, an inverse synchronization waiting instruction is output to the processor element $61_1$.

Then the processor element $61_1$ which received as input the inverse synchronization waiting instruction enters an inverse synchronization waiting state.

Then the instruction code "sleep" of the user program Prg_d is executed in the processor element $61_4$, and a notice indicating that the instruction code "sleep" is executed is output from the processor element $61_4$ to the arbiter 66. Then based on the notice, an instruction to release the inverse synchronization waiting state is output to the processor element $61_1$ from the arbiter 66 via the common bus 17 and the state is released in the processor element $61_1$.

Next, the processor element $61_1$ executes instruction codes "gen(Prg_e)", "wait(Prg_d)", and "wait(Prg_e)" of the user program Prg_aa. The processing of the executions is the same as the case explained above by using FIG. 2.

Figure 4:
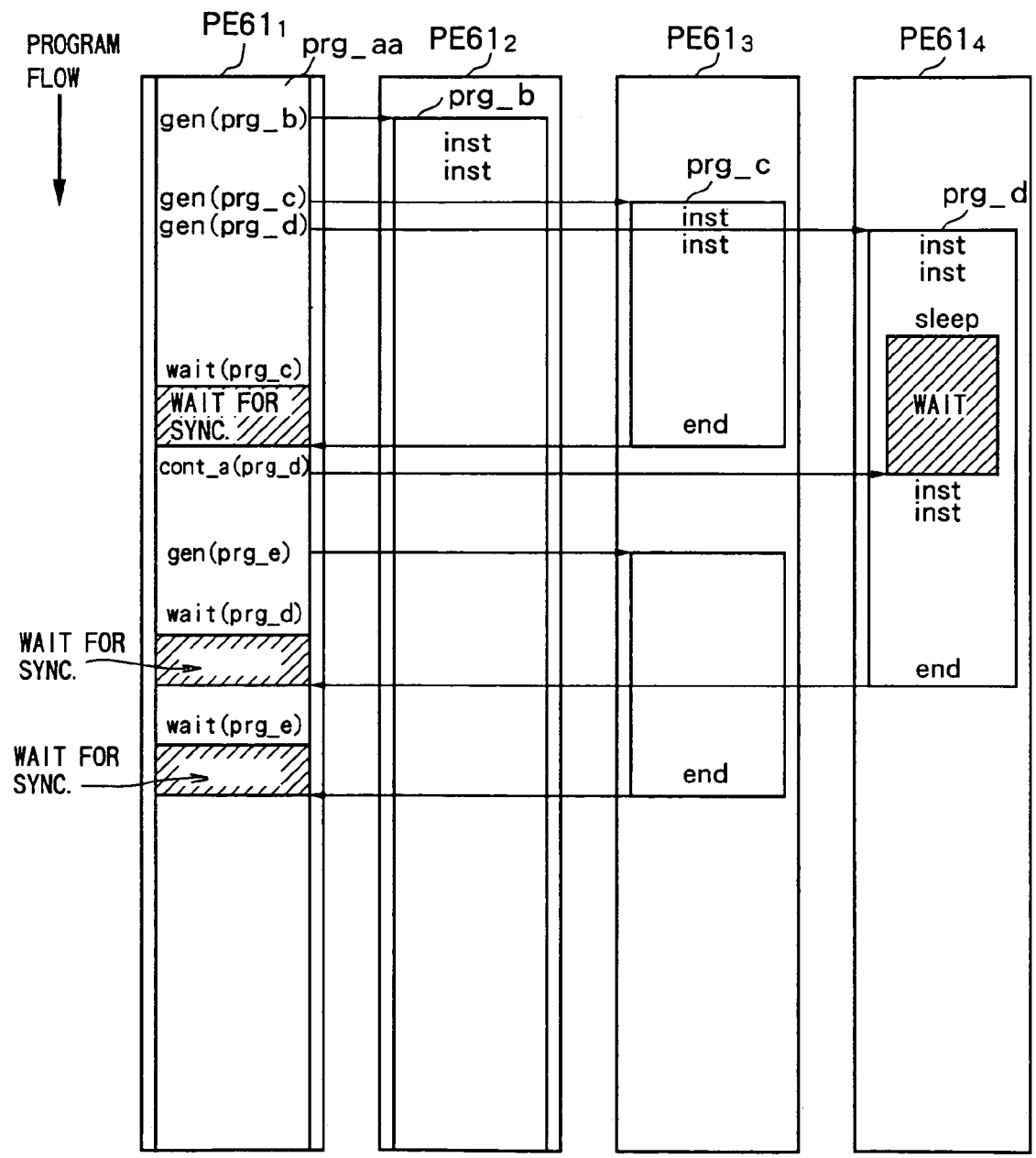
FIG. 4 is a view for explaining another operation of the multiprocessor according to the second embodiment of the present invention.

Note, for example as shown in FIG. 4, when the instruction code "sleep" in the processor element $61_4$ is executed at a timing earlier than execution of the instruction code "cont_a(Prg_d)" in the processor element $61_1$, the processor element $61_4$ enters a waiting state after executing the instruction code "sleep". When an instruction to release the waiting state based on the execution of the instruction code "cont_a (Prg_d)" in the processor element $61_1$ is input from the arbiter 66, the waiting state is released in the processor element $61_4$.

As explained above, according to the multiprocessor of the present embodiment, by using the above instruction code "cont_a", it becomes unnecessary, for example, to write the instruction code "wait" by which the synchronization waiting state is released by an execution of the instruction code "sleep" prior to the writing of the instruction code "cont" in the same way as in the first embodiment shown in FIG. 2. Namely, in the case shown in FIG. 2, even when the execution of the instruction code "sleep" of the user program Prg_d is carried out at a timing prior to that of the instruction code "cont_a(Prg_d)", the processor element $61_1$ enters an inverse synchronization waiting state and synchronization between the user programs Prg_aa and Prg_d is guaranteed.

As a result, a programmer can write the user program Prg_aa without considering the execution timing of the instruction code "sleep" of the user program Prg_d so the work load can be reduced.

The present invention is not limited to the above embodiments.

For example, in the above embodiments, a case was explained where instructions to release the waiting state, output by the processor elements $61_1$ to $61_2$ in accordance with the execution of the instruction codes "cont" and "cont_a", are output to processor elements $61_1$ to 614 executing user programs in the waiting state via the arbiter 66, however, the processor elements $61_1$ to $61_4$ executing user programs in the waiting state may monitor the common bus 17, so instructions to release the waiting state need not be input via the arbiter 66.

Also, similarly, a notice indicating that the instruction codes "sleep" and "end" output from the processor elements $61_1$ to 614 may be directly input to the corresponding processor elements $61_1$ to $61_4$ monitoring the common bus 17, that is, not via the arbiter 66.

Also, in the above embodiments, a case was explained where the instruction codes "gen", "cont", and "cont_a" are written only in the user programs Prg_a and Prg_aa. However, the instruction codes may be written in the user programs Prg_b, Prg_c, and Prg_d as well.

Also, the instruction code "sleep" may be written in a plurality of user programs.

Further, in the above embodiments, an example of a multiprocessor having four processor elements of identical configurations was shown. However, any number of the processor elements may be used if more than two and the configuration of the plurality of processor elements may be different.

Also in the above embodiment, a case was explained where the components shown in FIG. 1 were provided on the same semiconductor chip. The present invention, however, can also be applied to a distributed processing system wherein, for example, the processor elements $61_1$ to $61_4$ shown in FIG. 1 are provided in different computers connected by a network.

Summarizing the effects of the invention, as explained above, according to the parallel processor of the present invention, various forms of synchronization can be established among programs executed in parallel in a plurality of processing means.

Also, according to the parallel processing method and storage medium of the present invention, various forms of synchronization can be established among a plurality of processings carried out in parallel.

Also, according to the parallel processor of the present invention, by executing a waiting instruction by a processing means, it is possible to control the reading of a program from a first storage means to a second storage means corresponding to the processing means and to reduce the number of read operations of the program from the first storage means to the second storage means and thereby shorten the waiting time of the processing means.

While the invention has been described with reference to specific embodiment chosen for purpose of illustration, it should be apparent that numerous modifications could be made thereto by those skilled in the art without departing from the basic concept and scope of the invention.

What is claimed is:

1. A parallel processor comprising:
    a plurality of processor elements;
    a first processor element of said plurality of processor elements for executing a first user program of a plurality of user programs, said first processor element executing a wait instruction, said wait instruction suspending processing of said first user program;
    a second processor element of said plurality of processor elements for executing at least a second user program of said plurality of user programs, said second processor element executing a wait release instruction, said wait release instruction commanding said first processor element to resume said processing of said first user program, said second processor element continuing processing of said second user program after executing said wait release instruction;
    a plurality of local memory, each local memory being uniquely associated with a corresponding processor element of said plurality of processor elements; and
    a common memory connected to a common bus, said common memory storing said plurality of user programs, a corresponding user program of said plurality of user programs being provided to said corresponding processor element via said common bus, wherein:
    said second processor element executes a synchronization wait instruction, said synchronization wait instruction suspending processing of said second user program;
    said first processor element executes a program end instruction, said program end instruction resuming said processing of said second user program;
    said wait instruction resumes processing of said second user program after said second processor element executes said synchronization wait instruction;
    said first processor element notifies said second processor element that said first processor element is executing said wait instruction; and
    said second processor element executes a program execution instruction, said program execution instruction commanding said corresponding processor element to receive said corresponding user program from said common memory and to execute said corresponding user program.

2. A parallel processor as set forth in claim 1, wherein said plurality of processor elements and a common bus for connecting said plurality of processor elements are installed in a single semiconductor chip.

3. A parallel processor as set forth in claim 1, wherein
    said plurality of processor elements perform mutually parallel processing on the basis of instructions written in a program; and
    said plurality of processor elements are capable of communicating with each other via a common bus.

4. A parallel processor as set forth in claim 1, further comprising another processor element of said plurality of processor elements for executing another user program, said another processor element executing a program end instruction, said program end instruction resuming said processing of said second user program.

5. A parallel processor as set forth in claim 1, wherein said first processor element is said corresponding processor element and said first user program is said corresponding user program.

6. A parallel processor as set forth in claim 1, wherein said local memory continues to store said user program until said corresponding processor element executes a program end instruction indicating an end of a program.

7. A parallel processor as set forth in claim 1, wherein, when said second processor element enters a waiting state based on said wait instruction, said corresponding processor element which executed said program execution instruction executes said wait release instruction.

8. A parallel processor as set forth in claim 1, further comprising:
    an arbiter for determining which of said plurality of processor elements executes a program instructed to be executed by said program execution instruction, and for reading the program instructed to be executed by said program execution instruction from said common memory to said local memory associated with said corresponding processor element.

9. A parallel processing method comprising:
    suspending processing of a first user program of a plurality of user programs, said first user program including a wait instruction, a first processor element executing said wait instruction to suspend said processing of said first user program;
    resuming said processing of said first user program by executing a wait release instruction, said wait release instruction being included within a second user program of a plurality of user programs, a second processor element of said plurality of processor elements for executing said wait release instruction, said wait release instruction commanding said first processor element to resume said processing of said first user program, said second processor element continuing processing of said second user program after executing said wait release instruction;
    suspending processing of said second user program, said second processor element executing a synchronization wait instruction; and
    executing a program end instruction to resume said processing of said second user program, said first processor element executing said program end instruction, wherein:
    said wait instruction resumes processing of said second user program after said second processor element executes said synchronization wait instruction;

said first processor element notifies said second processor element that said first processor element is executing said wait instruction;
a plurality of local memory, each local memory is uniquely associated with a corresponding processor element of said plurality of processor elements;
a common memory connected to a common bus, said common memory storing said plurality of user programs, a corresponding user program of said plurality of user programs being provided to said corresponding processor element via said common bus; and
said second processor element executes a program execution instruction, said program execution instruction commanding said corresponding processor element to receive said corresponding user program from said common memory and to execute said corresponding user program.

10. A parallel processing method as set forth in claim 9, wherein, when said second processor element enters a waiting state based on said wait instruction, said corresponding processor element which executed said program execution instruction executes said wait release instruction.

11. A parallel processing method as set forth in claim 9, wherein:
said second processor element executes a program execution instruction, said program execution instruction commanding said corresponding processor element to receive said corresponding user program from said common memory and to execute said corresponding user program.

12. A storage medium for storing, in a computer-readable format the method of claim 9.

* * * * *